US011281667B2

United States Patent
Verma et al.

(10) Patent No.: US 11,281,667 B2
(45) Date of Patent: Mar. 22, 2022

(54) DISTRIBUTED STORAGE AND DISTRIBUTED PROCESSING POLICY ENFORCEMENT UTILIZING VIRTUAL IDENTIFIERS

(71) Applicant: BlueTalon, Inc., Redwood City, CA (US)

(72) Inventors: Pratik Verma, Hopkins, MN (US); Rakesh Khanduja, Hopkins, MN (US); Prerna Verma, Hopkins, MN (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 714 days.

(21) Appl. No.: 14/980,525

(22) Filed: Dec. 28, 2015

(65) Prior Publication Data
US 2016/0203181 A1    Jul. 14, 2016

Related U.S. Application Data

(60) Provisional application No. 62/101,341, filed on Jan. 8, 2015.

(51) Int. Cl.
| | | |
|---|---|---|
| *G06F 16/24* | (2019.01) | |
| *G06F 16/2453* | (2019.01) | |
| *G06F 16/248* | (2019.01) | |
| *G06F 16/25* | (2019.01) | |
| *G06F 16/245* | (2019.01) | |

(52) U.S. Cl.
CPC ...... *G06F 16/24534* (2019.01); *G06F 16/245* (2019.01); *G06F 16/248* (2019.01); *G06F 16/25* (2019.01)

(58) Field of Classification Search
CPC ......... G06F 17/30967; G06F 16/24534; G06F 16/245; G06F 16/25; G06F 16/248
See application file for complete search history.

(56) References Cited

U.S. PATENT DOCUMENTS

| | | |
|---|---|---|
| 5,664,173 A | 9/1997 | Fast |
| 6,427,020 B1 | 7/2002 | Rhoads |
| 6,539,425 B1 | 3/2003 | Stevens et al. |
| 6,694,306 B1 | 2/2004 | Nishizawa et al. |
| 6,820,082 B1 | 11/2004 | Cook et al. |
| 7,577,834 B1 | 8/2009 | Traversat et al. |

(Continued)

OTHER PUBLICATIONS

International Search Report and Written Opinion issued to international patent application No. PCT/US2016/012433, dated Mar. 11, 2016, 7 pgs.

(Continued)

*Primary Examiner* — Mohammad S Rostami
(74) *Attorney, Agent, or Firm* — Fiala & Weaver P.L.L.C.

(57) ABSTRACT

A non-transitory computer readable storage medium has instructions executed by a processor to assign virtual identifiers to blocks of a file that contain identical information in different data sources. A distributed storage and distributed processing query statement is received. Real name attributes of the query statement are equated with selected virtual identifiers. Access control policies are applied to the selected virtual identifiers to obtain policy results. The policy results are applied to the real name attributes of the query statement to obtain query results.

12 Claims, 7 Drawing Sheets

(56) References Cited

U.S. PATENT DOCUMENTS

| | | |
|---|---|---|
| 9,804,866 B2* | 10/2017 | Halls .................. G06F 9/45533 |
| 10,129,256 B2 | 11/2018 | Verma et al. |
| 2002/0031230 A1 | 3/2002 | Sweet et al. |
| 2002/0055921 A1 | 5/2002 | Yoshimura et al. |
| 2005/0289342 A1 | 12/2005 | Needham et al. |
| 2007/0005604 A1* | 1/2007 | Jain .................. G06F 17/30233 |
| 2007/0038500 A1* | 2/2007 | Hammitt .................. G06N 5/02 705/7.11 |
| 2007/0168364 A1 | 7/2007 | Douceur et al. |
| 2007/0250468 A1* | 10/2007 | Pieper .............. G06F 17/30867 |
| 2008/0046462 A1 | 2/2008 | Kaufman et al. |
| 2008/0263358 A1 | 10/2008 | Alme |
| 2009/0193493 A1 | 7/2009 | Becker et al. |
| 2010/0325097 A1 | 12/2010 | Er et al. |
| 2011/0141124 A1* | 6/2011 | Halls ...................... G06F 21/83 345/522 |
| 2011/0313981 A1 | 12/2011 | Ben-natan |
| 2012/0022928 A1* | 1/2012 | Wu .................. G06Q 30/0209 705/14.12 |
| 2012/0054217 A1* | 3/2012 | Clarke .............. G06F 17/30873 707/769 |
| 2012/0110014 A1* | 5/2012 | Snelling .................. H04L 43/12 707/776 |
| 2012/0117644 A1 | 5/2012 | Soeder |
| 2013/0091173 A1 | 4/2013 | Pooley et al. |
| 2013/0091355 A1 | 4/2013 | Lear et al. |
| 2013/0173578 A1* | 7/2013 | Epstein .................. G06Q 30/00 707/706 |
| 2013/0246796 A1 | 9/2013 | Lichtenstadt et al. |
| 2014/0047227 A1 | 2/2014 | Breternitz et al. |
| 2014/0052749 A1 | 2/2014 | Rissanen et al. |
| 2014/0101713 A1 | 4/2014 | Entin et al. |
| 2014/0163948 A1 | 6/2014 | Daly et al. |
| 2014/0280260 A1 | 9/2014 | Boukobza |
| 2014/0317226 A1 | 10/2014 | Resch et al. |
| 2015/0058480 A1 | 2/2015 | Allgaier et al. |
| 2016/0065436 A1* | 3/2016 | Disciascio .............. H04L 67/32 709/224 |

OTHER PUBLICATIONS

International Search Report and Written Opinion issued to international patent application No. PCT/US2016/012435, dated Mar. 11, 2016, 7 pgs.

International Search Report and Written Opinion issued to international patent application No. PCT/US2016/012429, dated Mar. 31, 2016, 7 pgs.

"Notice of Allowance Issued in U.S. Appl. No. 14/967,064", dated Jul. 16, 2018, 9 Pages.

"Notice of Allowance Issued in U.S. Appl. No. 14/967,095", dated Apr. 13, 2018, 11 Pages.

"Non Final Office Action Issued in U.S. Appl. No. 16/181,789", dated Jul. 10, 2019, 6 Pages.

"Office Action Issued in European Patent Application No. 16735392.9", dated Jan. 16, 2020, 5 Pages.

"Office Action Issued in European Patent Application No. 16735395.2", dated Jan. 24, 2020, 5 Pages.

"Office Action Issued in European Patent Application No. 16735392.9", dated Dec. 17, 2020, 6 Pages.

"Office Action Issued in European Patent Application No. 16735395.2", dated Dec. 18, 2020, 8 Pages.

* cited by examiner

Source A

| EMP | PAYROLL | DEMOGRAPHIC |
|---|---|---|
| EMPID | EMPID | EMPID |
| FIRSTNAME | SALARY | ADDRESS |
| LASTNAME | DEDUCTIONS | CITY |
| SocialSecurityNumber | | |

FIG. 3

Source B

| EMPDETAILS | PAYROLLINFO |
|---|---|
| EMPID | EMPID |
| FIRSTNAME | SALARY |
| LASTNAME | DEDUCTIONS |
| SSN | |
| ADDRESS | |
| CITY | |

FIG. 4

Source C

- EMPINFO
- EMPID
- FIRSTNAME
- LASTNAME
- SSN
- ADDRESS
- CITY
- SALARY
- DEDUCTIONS

FIG. 5

VEMPDATA

- VEMPID
- VFIRSTNAME
- VLASTNAME
- VSSN
- VADDRESS
- VCITY
- VSALARY
- VDEDUCTIONS

FIG. 6

| Source | Common | |
|---|---|---|
| EMP | VEMPDATA | Table mapping |
| PAYROLL | VEMPDATA | Table mapping |
| DEMOGRAPHIC | VEMPDATA | Table mapping |
| EMPDETAILS | VEMPDATA | Table mapping |
| PAYROLLINFO | VEMPDATA | Table mapping |
| EMPINFO | VEMPDATA | Table mapping |
| EMP.EMPID | VEMPDATA.VEMPID | Column mapping |
| EMP.FIRSTNAME | VEMPDATA.VFIRSTNAME | Column mapping |
| EMP.LASTNAME | VEMPDATA.VLASTNAME | Column mapping |
| EMP.SocialSecurityNumber | VEMPDATA.VSSN | Column mapping |
| DEMOGRAPHIC.ADDRESS | VEMPDATA.VADDRESS | Column mapping |
| DEMOGRAPHIC.CITY | VEMPDATA.VCITY | Column mapping |
| PAYROLL.SALARY | VEMPDATA.VSALARY | Column mapping |
| PAYROLL.DEDUCTIONS | VEMPDATA.VDEDUCTIONS | Column mapping |
| EMPDETAILS.EMPID | VEMPDATA.VEMPID | Column mapping |
| EMPDETAILS.FIRSTNAME | VEMPDATA.VFIRSTNAME | Column mapping |
| EMPDETAILS.LASTNAME | VEMPDATA.VLASTNAME | Column mapping |
| EMPDETAILS.SSN | VEMPDATA.VSSN | Column mapping |
| EMPDETAILS.ADDRESS | VEMPDATA.VADDRESS | Column mapping |
| EMPDETAILS.CITY | VEMPDATA.VCITY | Column mapping |
| PAYROLLINFO.SALARY | VEMPDATA.VSALARY | Column mapping |
| PAYROLLINFO.DEDUCTIONS | VEMPDATA.VDEDUCTIONS | Column mapping |
| EMPINFO.EMPID | VEMPDATA.VEMPID | Column mapping |
| EMPINFO.FIRSTNAME | VEMPDATA.VFIRSTNAME | Column mapping |
| EMPINFO.LASTNAME | VEMPDATA.VLASTNAME | Column mapping |
| EMPINFO.SSN | VEMPDATA.VSSN | Column mapping |
| EMPINFO.ADDRESS | VEMPDATA.VADDRESS | Column mapping |
| EMPINFO.CITY | VEMPDATA.VCITY | Column mapping |
| EMPINFO.SALARY | VEMPDATA.VSALARY | Column mapping |
| EMPINFO.DEDUCTIONS | VEMPDATA.VDEDUCTIONS | Column mapping |

FIG. 7

| Common Policy | Source A | Policy |
|---|---|---|
| VEMPDATA.VSSN = DENY | "A" | EMP.SocialSecurityNumber = DENY |
| | "B" | EMPDETAILS.SSN |
| | "C" | EMPINFO.SSN |

FIG. 8

| Method | resource | common concept |
|---|---|---|
| A | /home/accounts/accounts.csv | vaccounts |
| B | accounts | vaccounts |

FIG. 9

| Common Policy | Method | |
|---|---|---|
| vaccounts = DENY | A | /home/accounts/accounts.csv = DENY |
| | B | accounts = DENY |
| | | |

FIG. 10

Original query for Source B select ssn from empdetails;

Mappings

EMPDETAILS to VEMPDATA
    EMPDETAILS.SSN to VEMPDATA.VSSN

Query for virtual identifier select vempdata.vssn from vempdata;

Policy rule

VEMPDATA.VSSN = deny

Query for virtual identifier with policy applied select 0 as vempdata.vssn from vempdata;

Mappings

EMPDETAILS to VEMPDATA
    EMPDETAILS.SSN to VEMPDATA.VSSN

Final query for Source B with policy applied select 0 as ssn from empdetails;

FIG. 11

DISTRIBUTED STORAGE AND DISTRIBUTED PROCESSING POLICY ENFORCEMENT UTILIZING VIRTUAL IDENTIFIERS

CROSS-REFERENCE TO RELATED APPLICATION

This application claims priority to U.S. Provisional Patent Application Ser. No. 62/101,341, filed Jan. 8, 2015, the contents of which are incorporated herein by reference.

FIELD OF THE INVENTION

This invention relates generally to data processing in a network. More particularly, this invention is directed toward distributed storage and distributed processing policy enforcement utilizing virtual identifiers.

BACKGROUND OF THE INVENTION

Query statements can be formed to obtain data from distributed storage and distributed processing resources. The distributed storage may be a distributed database or a distributed file system. Apache Hadoop® is an open-source software framework for distributed storage and distributed processing of very large data sets on computer clusters built from commodity hardware.

The core of Apache Hadoop consists of a storage part (Hadoop Distributed File System (HDFS)) and a processing part (MapReduce®). Hadoop splits files into large blocks and distributes them amongst the nodes in the cluster. To process the data, Hadoop MapReduce transfers packaged code for nodes to process in parallel, based on the data each node needs to process. This approach takes advantage of data locality (nodes manipulating the data that they have) to allow the data to be processed faster and more efficiently than it would be in a more conventional supercomputer architecture that relies on a parallel file system where computation and data are connected via high-speed networking.

The Hadoop ecosystem has a variety of access methods. Apache Hive® is a data warehouse infrastructure built on top of Hadoop for data summarization, query and analysis. Apache Spark® is an open source cluster computing framework that allows user programs to load data into a cluster's memory and query it repeatedly. Solr® is an open source enterprise search platform that enables full-text search, hit highlighting, faceted search real-time indexing, dynamic clustering, database integration, NoSQL features and rich document handling.

Each access method has a query language associated with it to define what data should be returned by the server and what operations should be done with the data. The different access methods make policy enforcement complex since policy enforcement rules need to be generated for each data source and the various access method supported by the data source.

Therefore, it would be desirable to identify a technique for simplified policy enforcement.

SUMMARY OF THE INVENTION

A non-transitory computer readable storage medium has instructions executed by a processor to assign virtual identifiers to blocks of a file that contain identical information in different data sources. A distributed storage and distributed processing query statement is received. Real name attributes of the query statement are equated with selected virtual identifiers. Access control policies are applied to the selected virtual identifiers to obtain policy results. The policy results are applied to the real name attributes of the query statement to obtain query results.

A non-transitory computer readable storage medium has instructions executed by a processor to assign virtual identifiers to a column of a table that contains identical information in different databases. A distributed storage and distributed processing query statement is received. Real name attributes of the query statement are equated with selected virtual identifiers. Access control policies are applied to the selected virtual identifiers to obtain policy results. The policy results are applied to the real name attributes of the query statement to obtain query results.

BRIEF DESCRIPTION OF THE FIGURES

The invention is more fully appreciated in connection with the following detailed description taken in conjunction with the accompanying drawings, in which:

FIGS. 3-5 illustrate exemplary data sources.

FIG. 6 illustrates a virtual common model for the data sources of FIGS. 3-5.

FIG. 7 illustrates mappings for the virtual common model.

FIG. 8 illustrates policy expression based upon a virtual identifier.

FIG. 9 illustrates file data sources and access methods.

FIG. 10 illustrates file access policy expression based upon a virtual identifier.

FIG. 11 illustrates virtual mappings and policy rule applications in accordance with embodiments of the invention.

Like reference numerals refer to corresponding parts throughout the several views of the drawings.

DETAILED DESCRIPTION OF THE INVENTION

Figure 1:
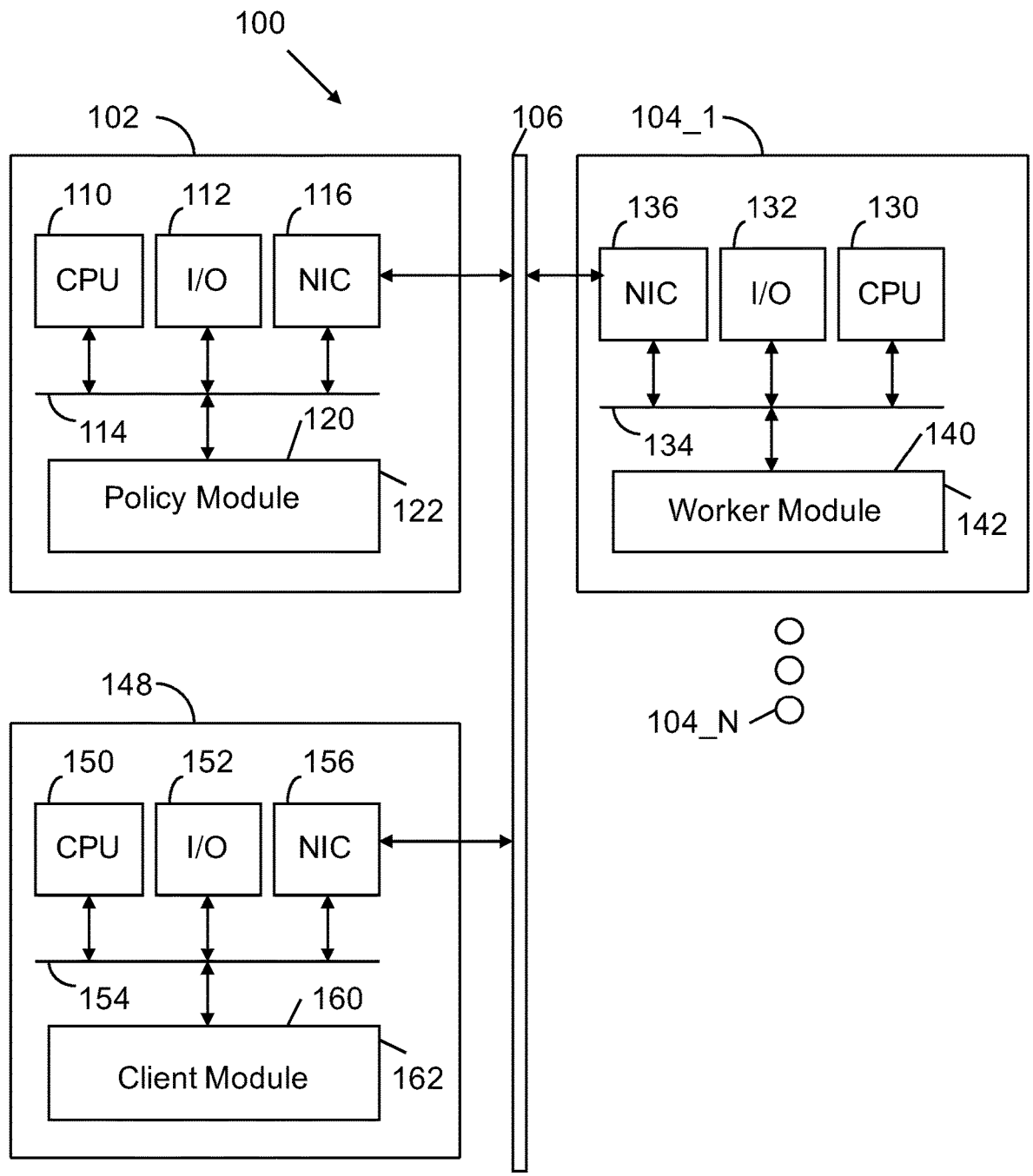
FIG. 1 illustrates a network configured in accordance with an embodiment of the invention

FIG. 1 illustrates a network 100 configured in accordance with an embodiment of the invention. The network 100 includes a server 102 connected to a set of servers 104_1 through 104_N via a network 106. The server 102 can be a master server, while servers 104_1 through 104_N are worker servers in a distributed storage and a distributed processing environment. Network 106 may be any combination of wired and wireless networks.

Server 102 includes standard components, such as a central processing unit 110 connected to input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory stores instructions executed by the central processing unit 110 to implement operations of the invention. In particular, the memory 120 stores a policy module 122 to implement operations disclosed herein. The policy module utilizes virtual identifiers. A virtual identifier manifests a common concept that is expressed using different real terms in different data sources. Thus, the virtual identifier operates as a proxy for all of the disparate expressions used in different data sources. This proxy may then be utilized to enforce a policy in the virtual domain, which may then be leveraged at each individual data source, thereby obviating the need for separate policies at each individual data source.

Each worker server 104_1 through 104_N also includes standard components, such as a central processing unit 130, bus 134, input/output devices 132 and a network interface circuit 136. A memory 140 is connected to bus 132. The memory 140 stores a worker module 142 to implement distributed storage and distributed processing operations.

The network 100 may also include a client machine 148. The client machine 148 includes standard components, such as a central processing unit 150, input/output devices 152, a bus 154 and a network interface circuit 156. A memory 160 is connected to bus 154. The memory 160 stores a client module 162 with instructions executed by the central processing unit 150. The client module 162 may facilitate the formation of a query, which is then directed toward the policy module 122 of master server 102.

Figure 2:
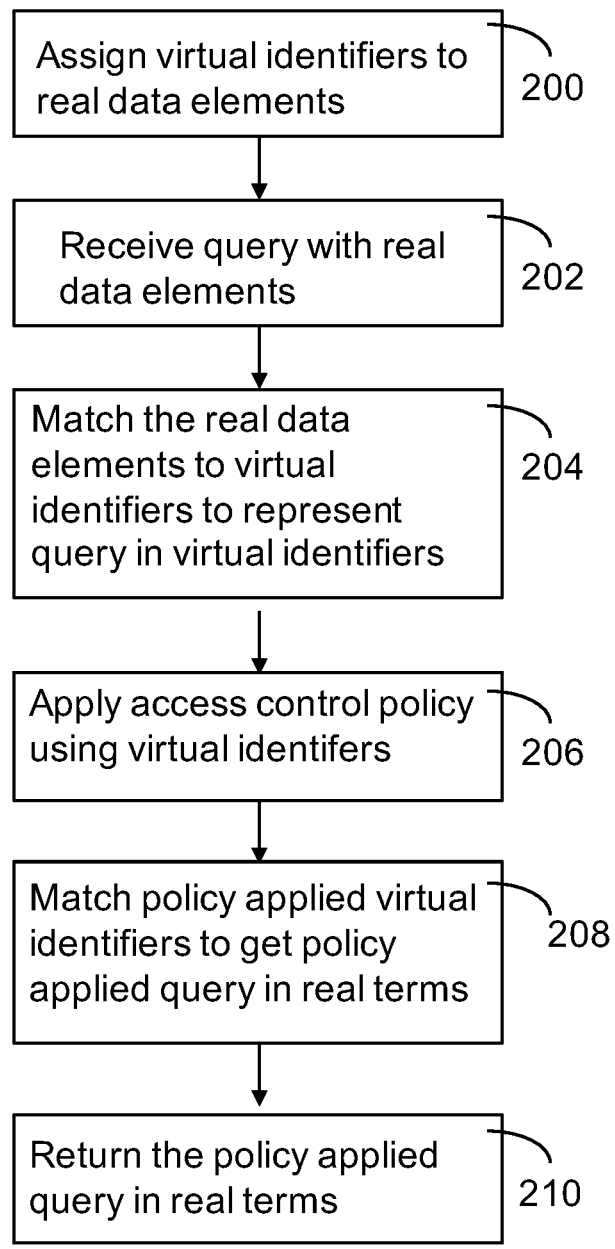
FIG. 2 illustrates processing operations associated with an embodiment of the invention.

FIG. 2 illustrates processing operations associated with an embodiment of the policy module 122. Initially, virtual identifiers are assigned to real data elements 200. A virtual identifier manifests a common concept that is expressed using different real terms in different data sources, examples of which are provided below. This assignment can be done one time or repetitively. The virtual identifiers can be picked based on any criteria but are specified as string literals or expressions. A query statement is then received 202 from another source as input. Real name attributes of the query statement are matched with virtual identifiers 204 using the information created in block 200. An access control policy is then applied utilizing the virtual identifier 206. The virtual identifiers are compared once again with the real data elements to make the policy applied on virtual identifiers in block 206 to be effective on the real data elements 208. The policy applied query in real data elements terms is returned back to the source or sent to another target 208. With this approach, a policy created using virtual identifiers can be applied on one or more real data elements through one or more virtual identifier to real data element mapping.

Consider the following example. FIG. 3 illustrates source A with three different tables EMP, PAYROLL and DEMOGRAPHIC. The table EMP includes columns EMPID, FIRSTNAME, LASTNAME and SocialSecurityNumber. The table PAYROLL includes columns EMPID, SALARY, and DEDUCTIONS, where EMPID is intended to contain the same type of data as EMPID in table EMP. The table DEMOGRAPHIC includes EMPID, ADDRESS and CITY, where EMPID is intended to contain the same type of data as EMPID columns in tables EMP and PAYROLL.

Source B of FIG. 4 has two other tables EMPDETAILS and PAYROLLINFO, which are intended to contain similar types of information as tables in Source A in the example above. In addition, the EMPDETAILS table has fields common with Source A of FIG. 3, but the field labeled SocialSecurityNumber in table EMP in Source A is expressed as field labeled SSN in table EMPDETAILS in Source B. The table PAYROLLINFO in Source B shares the structure and naming for the fields with the table PAYROLL in Source A.

Source C of FIG. 5 has a single table EMPINFO, which includes some of the same fields with the same names as table EMPDETAILS in Source B of FIG. 4, but also includes additional fields not present in Source B.

Based upon the three data sources of FIGS. 3-5, the virtual identifiers of FIG. 6 may be designated. There may be other design schemes for creating the mappings between the virtual identifiers and real data element names. These can be assigned either manually or created automatically using a library of terms. To simplify understanding in this example, each virtual identifier uses the real expression with the letter v in front of it. For example, instead of SSN, the virtual identifier VSSN is used. In real life scenarios, the virtual identifiers should be picked to provide some contextual information that may be useful to business owners specifying the access control rules.

FIG. 7 illustrates a virtual mapping that may be used in accordance with an embodiment of the invention. The first column of the table in FIG. 7 lists the real names of each of the data elements including tables and columns from all the three sources (A, B and C) in the example above. The second column of the table in FIG. 7 lists the corresponding virtual identifiers picked in this example. The last column in the table in FIG. 7 lists the type of mapping, whether it's a table to virtual identifier or a column to virtual identifier mapping. In this example, the first six entries are for table mappings. The virtual identifiers for the table mappings reference VEMPDATA of FIG. 6. In this example, the mappings themselves are represented. The mappings themselves may be stored or represented in any data structure that allows easy use, export and import of this information from another source.

The remaining entries of FIG. 7 are column mappings. Each column mapping expresses the real name of a column data element as a combination of a table name and a column field from the source and the virtual identifier as a combination of the virtual identifier from a table mapping and a column identifier. For example, the seventh entry of FIG. 7 is EMP.EMPID, which corresponds to the name of the first column of Source A of FIG. 3 (EMP) and the first field of the same table (EMPID). The corresponding virtual identifier, in this case is VEMPDATA.VEMPID. There is also a corresponding table mapping defined between a real table EMD and the virtual identifier VEMPDATA.

The mappings between the virtual identifiers and real data elements are used to enforce a policy that is expressed in terms of virtual identifiers. Consider the case of VEMDATA.VSSN, a policy may be expressed as shown in FIG. 8. The policy is to deny access based upon the common virtual identifier VEMPDATA.VSSN. Based on the mappings shown in FIG. 7, the corresponding policy rules that should be effective for the three different columns in three different data sources are shown in FIG. 8. The rules that are effective on the real names that are derived from the rule created on the virtual identifier are computed on the fly, but may also be pre-computed and stored for use.

Consider an example shown in FIG. 11. A user's query received from an application or another source that can be executed on the data source is represented in terms of real data elements, for example 'select ssn from empdetails' in case of Source B. The real data elements 'ssn' and 'empdetails' could be assigned to virtual identifiers 'VEMPDATA' and 'VSSN' respectively, using a table and a column mapping shown in FIG. 7. The table mapping is 'EMP' to 'VEMPDATA' and the column mapping is 'EMP.SSN' to 'VEMPDATA.VSSN'. The query statement 'select ssn from empdetails' received for processing can be represented in terms of virtual identifiers using these mappings as input for the determination of the access control policy. An example policy could be a deny read on VEMPDATA.VSSN field as shown in FIG. 8. The input query statement for access control policy 'select vempdata.vssn from vempdata' becomes 'select 0 as vempdata.vssn from vempdata' after the example policy rule is applied. The policy applied query represented in terms of virtual identifiers can be reformatted in terms of real data elements using the mappings described above in this example. The reformatted query with policy applied that can be executed on the Source B becomes 'select 0 as ssn from empdetails'. Using the same mappings and policy rule, a query like 'select socialsecuritynumber from emp' for Source A becomes 'select 0 as socialsecuritynumber from emp'.

The foregoing example relates to database accesses. The same techniques can also be applied for file accesses. Consider the example of a Hadoop file system storing accounts data identified as/home/accounts/accounts.csv. FIG. 9 illustrates two access methods to the file. Each access method has a resource descriptor and a common virtual concept identifier.

FIG. 10 illustrates a rule on vaccounts that is applied to all the resources mapped to vaccounts. Once again, the common policy is to deny access. Individual access methods A and B have separate expressions using real terms to enforce access denial.

Thus, a common logical concept expressed as a virtual identifier is used for access control. A policy is associated with the virtual identifier. The policy is enforced using real terms at the data source.

The policy may be expressed in terms of an individual user or group of users. The policy module 122 includes a policy enforcement log with audit entries for each policy enforcement action.

Thus, the policy module 122 enforces access control by interrupting a request, parsing meta-data from the request and executing it in a policy engine. The policies include the ability to map fields from different storage formats (file, table, collection, etc.) into a common logical concept and author policy on that concept. While the request is interrupted, the policy engine can add context from this logical concept mapping to make its policy decision. This allows a consistent policy to be enforced across different access methods.

The types of access control policies and the details associated with components of the policies are listed in this section. A policy set is a collection of one or more rules. A collection of rules can either be grouped into a labeled policy set or be grouped by default into a default policy set. A labeled policy set is used to enforce purpose based access control.

For a given user or group, any rule that is not explicitly grouped into a labeled policy set gets assigned to the default policy set for that user or the group. For a given user, when a policy set is not specified at connection time, the policy applied (most allow or most deny) is the union of all the rules of the default policy set of the user and of all the groups that the user belongs to in the user domain.

For a given user, a list of all the labeled policy sets for that user or for the groups that the user belongs to are populated in the client side browser session for picking by the end user for the duration of the session. The access control is enforced only per the rules that are grouped into the policy set specified in the login. An audit entry is created in the policy enforcement log.

For a given user, when a policy set is specified in a comment of the query, the specified policy set is compared against the list of all the labeled policy sets for that user or for the groups that the user belongs to. If the specified policy set is one of the allowed policy sets, then the access control is enforced only per the rules that are grouped into the specified policy set. Otherwise a deny all policy is returned. In both cases, an audit entry is created in the policy enforcement log.

An attribute is a variable for which a value can be determined at run-time and that can be used to make a policy decision. An attribute is used in a record filter qualifier within a rule. A session attribute is determined for each client session and is either specified by the end-application (specified session attribute) within a query comment or is determined automatically by the intercept (detected session attribute) from within the protocol, client driver, network, etc. Examples of session attributes include <USERDN> and <COL>, which are detected from the connection initiation and query respectively. A dependent attribute is a variable that can be derived from another dependent attribute or session attribute through one or a series of more than one SQL or LDAP queries. Examples of dependent attributes include #DEPT#, where the value is obtained by doing a SQL look-up using the query 'select dept from hr where username=<USERDN>'. A static attribute is a special case of an attribute which is used to label special values that are to be used as macros for values with a meaning.

Examples of static attributes include #TRUE#, where the value is Boolean 'TRUE'.

An attribute source is a SQL database or an LDAP directory where the data for the lookups to resolve an attribute exists. An attribute source requires a connection and is used to resolve a set of attributes.

For a given user, all relevant attributes are resolved once per session or once per query by the policy engine through a lookup against an attribute source. This is cached for use in subsequent queries. The caching time can be changes for each attribute individually.

A dependent attribute can be used as part of a query in another dependent attribute for a series of reusable attributes. The optimal depth of a daisy chain of dependent attributes is determined by the connection creation time expected by the end-user and the capacity of the attribute directory. An attribute has an immutable name, a dynamically evaluated mutable value that conforms to a mutable data type, and belongs to one of the following attribute classes: static, functional, sql query with one select variable, or ldap attribute.

The following operations are associated with an attribute. First, there is a definition of an attribute source. This requires obtaining information for a SQL database or an LDAP connection from the user and validating that the connection is reachable. At any given time, the live/dead status of a given attribute source is determined using a test dual query or an LDAP bind. Second, there is a definition and validation of an attribute. This requires creating a new attribute object in a repository using the user interface that is named. Next, the type of object it is selected from (LDAP or SQL) is specified. For LDAP, this requires selecting a connection for an attribute source from a list of pre-defined LDAP attribute sources. Then for a given attribute source, a list of fields available within the attribute source is populated. The value of this attribute object should be resolvable from an LDAP query, where the return value matches one of these fields. For SQL, this requires selecting a connection for an attribute source from a list of pre-defined LDAP attribute sources.

A rule specifies a resource, an optional qualifier, an action and an effect. A rule is used to define an entitlement to a resource and is used to control the granularity of the access control policy.

A resource is a data object or a service to be protected. A data object resource can be one of the following: database, schema, table, column, collection, column family, column qualifier, a folder, a file, a field within a file, etc. A service resource can be one of the following: hive (ip/port), impala (ip/port), pig (application id), hue (application id), external, etc.

An action is one of the following: read, write, use, connect, or execute. The actions are dependent on the type of resource, for example a data object or a service. An effect is one of either allow or deny. If a qualifier as a record filter is defined, then the effect is interpreted as allow conditional or deny conditional in the back-end.

A qualifier is a set of restraints that limits the resource entitlement along either the row dimension or within a cell dimension. This can be either a record filter or a transformation.

If a qualifier is a record filter, then a condition must be defined in terms of variable=value conditions, where the variable must be a field within the resource and the value can be a static value, an in-line function or a dynamically evaluated attribute. The rows for which the condition is evaluated to be true are affected by the effect.

If a qualifier is a transformation, then an operation must be defined in terms of a static value, an in-line function or a dynamically evaluated attribute. A rule or a policy set can be granted to a user or a group. The association is an untagged relationship, i.e., it is created automatically behind the scenes, but is not accessible as an object within the user interface.

A user or a group are special types of roles. By user and group we mean for an object of type person or group from LDAP.

A row filter can be defined in terms of variable=value conditions, where the variable is a field within the resource and the value can be a static value, an in-line function or a dynamically evaluated attribute. The rows for which the condition is evaluated to be true, are affected by the effect.

A transformation function can be defined in terms of a static value, an in-line function or a dynamically evaluated attribute. An effect is the outcome of the policy decision that can be either allow or deny against the action specified in the rule.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing description of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:
   assign virtual identifiers to blocks of a file that contain identical information in different data sources of a distributed storage and distributed processing system;
   receive a query statement, wherein the query statement is a distributed storage and distributed processing query statement for processing by the distributed storage and distributed processing system;
   equate real name attributes of the query statement with selected virtual identifiers that manifest a common concept that is expressed using different real terms in different data sources of the distributed storage and distributed processing system, such that each virtual identifier operates as a proxy for disparate expressions used in the different data sources;
   apply access control policies to the selected virtual identifiers to obtain policy results in a virtual domain; and
   apply the policy results from the virtual domain to the real name attributes of the query statement to obtain query results.

2. The non-transitory computer readable storage medium of claim 1 wherein the access control policies specify access control at a user level.

3. The non-transitory computer readable storage medium of claim 1 wherein the access control policies specify access control at a user group level.

4. The non-transitory computer readable storage medium of claim 1 wherein the virtual identifiers have associated table mappings.

5. The non-transitory computer readable storage medium of claim 1 wherein the virtual identifiers have associated column mappings.

6. The non-transitory computer readable storage medium of claim 1 further comprising instructions executed by the processor to enter audit entries in a policy enforcement log for each policy enforcement action.

7. A non-transitory computer readable storage medium with instructions executed by a processor to:
   assign virtual identifiers to columns of a table that contain identical information in different databases of a distributed storage and distributed processing system;
   receive a query statement, wherein the query statement is a distributed storage and distributed processing query statement for processing by the distributed storage and distributed processing system;
   equate real name attributes of the query statement with selected virtual identifiers that manifest a common concept that is expressed using different real terms in different data sources of the distributed storage and distributed processing system, such that each virtual identifier operates as a proxy for disparate expressions used in the different data sources;

apply access control policies to the selected virtual identifiers to obtain policy results in a virtual domain; and apply the policy results from the virtual domain to the real name attributes of the query statement to obtain query results.

8. The non-transitory computer readable storage medium of claim 7 wherein the access control policies specify access control at a user level.

9. The non-transitory computer readable storage medium of claim 7 wherein the access control policies specify access control at a user group level.

10. The non-transitory computer readable storage medium of claim 7 wherein the virtual identifiers have associated table mappings.

11. The non-transitory computer readable storage medium of claim 7 wherein the virtual identifiers have associated column mappings.

12. The non-transitory computer readable storage medium of claim 7 further comprising instructions executed by the processor to enter audit entries in a policy enforcement log for each policy enforcement action.

* * * * *